United States Patent [19]
Hannen

[11] Patent Number: 6,047,586
[45] Date of Patent: Apr. 11, 2000

[54] METHOD FOR MANUFACTURING A METAL TUBE WITH AT LEAST ONE OPTICAL FIBER THEREIN

[75] Inventor: Lutz Hannen, Mönchengladbach, Germany

[73] Assignee: Alcatel, Paris, France

[21] Appl. No.: 09/160,755

[22] Filed: Sep. 25, 1998

[30] Foreign Application Priority Data

Oct. 2, 1997 [DE] Germany ............................ 197 43 616

[51] Int. Cl.⁷ .................................................. B21B 23/00
[52] U.S. Cl. ................................ 72/262; 72/258; 72/264; 72/368
[58] Field of Search .............................. 72/258, 259, 262, 72/264, 271, 253.1, 368; 425/131.1, 133.1, 380; 264/171.14; 11/171.17

[56] References Cited

U.S. PATENT DOCUMENTS

| | | | |
|---|---|---|---|
| 4,242,368 | 12/1980 | Nagai et al. | 72/258 |
| 5,222,284 | 6/1993 | Maddock | 72/258 |
| 5,676,892 | 10/1997 | Kertscher | 264/1.28 |

FOREIGN PATENT DOCUMENTS

| | | | |
|---|---|---|---|
| 377390 | 7/1990 | European Pat. Off. | 72/258 |
| 0 436 987 A1 | 7/1991 | European Pat. Off. | |
| 2823974 | 1/1979 | Germany | 72/258 |
| 43 37 486 A1 | 3/1995 | Germany | |
| 56-132303 | 10/1981 | Japan | |
| 57-199516 | 12/1982 | Japan | 72/258 |
| 57-191604 | 2/1983 | Japan | |
| 58-125314 | 7/1983 | Japan | 72/268 |
| 1709440 | 1/1992 | U.S.S.R. | 72/258 |

OTHER PUBLICATIONS

Kontinuierliches Strangpressen und Weiterentwicklung durch das Conform–Verfahren, Draht Und Kabel Panorama, Jan./Feb. 1987, pp. 58–61.

*Primary Examiner*—Ed Tolan
*Attorney, Agent, or Firm*—Ware, Fressola, Van der Sluys & Adolphson LLP

[57] ABSTRACT

A method is proposed for producing a metal tube (1) with one or several optical fibers (2) extending therethrough. Metal (10) applied to the surface of a frictional wheel (11) is conveyed to a retaining space (12) by applying pressure and temperature. The metal (10) subsequently exits from the retaining space (12) through the annular exit opening (16) of a forming nozzle (17) in a direction which is approximately tangential to the circumference of the wheel, and solidifies to form the metal tube (1). The optical fibers (2) are passed through a feed opening (19) disposed in the center of the forming nozzle (17), with all sides of the optical fibers spaced apart from the exit opening (16). The tube forming process is repeated to form an outer metal tube (4) on the metal tube (1) with the optical fibers (2) disposed therein.

10 Claims, 1 Drawing Sheet

METHOD FOR MANUFACTURING A METAL TUBE WITH AT LEAST ONE OPTICAL FIBER THEREIN

BACKGROUND OF THE INVENTION

1. Technical Field

The invention relates to a method for manufacturing a metal tube with at least one optical fiber therein.

2. Description of the Prior Art

Optical waveguides which can be mechanically stressed, can be manufactured with conventional techniques by enclosing optical fibers in a metal tube. With this mechanical protection, for example, optical waveguides can be carried in an electric overhead cable by stranding the metal tube with the overhead wires. Since overhead wires are generally made of aluminum, moisture can cause electrochemical contact corrosion when the optical fibers are sheathed in stainless-steel tubes.

To prevent corrosion, the publication EP 0 436 987 B1 proposes to coat the outside of the stainless-steel tube with a base metal, in particular, to glue aluminum tape running in the longitudinal direction to the outside of the tube. This method is not only costly, but also has the disadvantage that the aluminum tape can easily become detached from the stainless-steel tube under stress and during subsequent production steps. In addition, manufacture of the stainless-steel tube and sealing the tube longitudinally by welding is complex.

Another known technique is the Conform process for manufacturing profiles and tubes from non-ferrous metals (Draht und Kabel Panorama (Wire and Cable Panorama), January/February 1987, p. 59 pp.). With this technique, metal in form of a strand is introduced into a groove disposed about the circumference of a rotating frictional wheel. The wheel conveys the metal to a retaining space of a retaining block that engages in the groove and seals the groove. The rotation of the frictional wheel produces high temperatures and high pressures in the retaining space, which plastically deform the metal. The metal can then be extruded through a forming nozzle and solidify to form a profile or a tube. If the forming nozzle is oriented approximately parallel to the circumference of the wheel, then cables which are guided through a central opening of the forming nozzle, can be coated with aluminum. However, there has never been disclosed a method using the Conform process for fabricating metal tubes for optical waveguides. In particular, it is difficult to introduce the fibers into the completely closed metal tube and to prevent damage to the fibers in view of the pressures and temperatures applied during the Conform process.

SUMMARY OF THE INVENTION

With the foregoing in mind, it is the object of the invention to develop an advantageous method for manufacturing a metal tube with optical fibers that prevents corrosion.

According to a general aspect of the invention, the metal tube surrounding an optical fiber, in particular a glass fiber, is manufactured by a continuous process, e.g. by the Conform process. The metal tube may enclose a single fiber or several optical fibers forming a multi-fiber bundle. Non-ferrous metals, in particular aluminum, aluminum alloys or copper, can be used to manufacture the tube. If the metal tube is expected to make contact with other metal parts during operation, for example with the wires of an electrical overhead cable, then corrosion can be advantageously prevented if the surfaces of the tube and the metal parts have the same electrochemical potential, and are preferably made of the same material.

The metal tube is manufactured by conveying the starting material in the conventional manner of the Conform process on the surface of a frictional wheel to a retaining space. On the circumference of the frictional wheel, there are arranged one or several grooves extending through the retaining space. The metal is introduced in these grooves preferably in form of a strand, possibly also in form of particles or a melt. The retaining space is formed by the recess of a retaining block that is disposed adjacent to the surface of the frictional wheel and has a projection distending into the cross-section of the groove. The metal contained in the retaining space is heated by friction at the wheel surface and is simultaneously pressurized by the material which continues to be conveyed by the wheel, and is thereby transformed into a plastic state. As a result, the metal can be extruded from the retaining space through a forming nozzle.

The forming nozzle has an annular exit opening with, for example, a circular or oval annular cross section. The plastic metal exits the forming nozzle in an axial direction and solidifies to form a seamless tube. More particularly, a boundary surface exists on the side of the exit opening facing the nozzle center and forming the inner surface of the tube. During the time the metal is extruded, the optical fibers are conveyed to the center of the forming nozzle through a second opening. To prevent mechanical or thermal damage when the tube is formed, the optical fibers are spaced apart from the exit opening for the metal.

The fibers are conveyed at least with the same speed at which the tube is produced. The fibers preferably have a small excess length to prevent damage when the tube is subsequently processed, for example, when the tube is stranded to produce an aerial cable. To prevent excess bending of the fibers in the region of the forming nozzle, the forming nozzle is preferably oriented in a direction parallel to a tangent to the wheel's circumference. In this way, the fibers can extend in a straight line through the forming nozzle and clear the wheel.

As a result, the method can be carried out easily and used to cost-effectively manufacture seamless metal tubes with optical fibers extending therethrough.

In an advantageous embodiment of the invention, the fibers are disposed inside a metal tube extending through the feed opening. The inner metal tube can be made, for example, of steel or of an aluminum alloy. The inner metal tube defines the distance between the optical fibers and the metal extruded from the exit nozzle. The inner metal tube can also form an inner boundary surface for the plastic metal exiting from the forming nozzle. The annular exit opening can also be open with respect to the axis of the forming nozzle, so that the metal is pressed onto the outer surface of the inner tube. In this manner, a multi-layer tube with mechanically strongly bonded layers can be formed, wherein the individual layers can no longer become detached during the subsequent production steps or due to environmental conditions.

The outer surface of the inner metal tube can also be coated with an insulator before passing through the feed opening. The individual layers of the multi-layer metal tube formed when the outer metal layer is subsequently extruded, are then electrically isolated from each other by a dielectric. A voltage can then be applied to the electrically conductive layers to supply power, in particular to components cooperating with the enclosed fibers, such as electro-optic amplifiers or converters. Metal tubes of this type can be incorporated in many types of cables, for example cables installed inside buildings. Advantageously, a strain relief prevents the tube form being bent too tightly, thereby reducing the potential for damaging the optical fibers.

If the metal tube comprises several metal layers, then all layers are preferably produced with the Conform process. The optical fibers and the fibers with the surrounding inner metal layers, respectively, are passed through the feed opening of the forming nozzle. Each of the outer metal layers is produced by extruding the metal through the exit opening of the forming nozzle. The number of consecutive forming nozzles preferably corresponds to the number of metal layers of the tube. The method can be used to produce, for example, fibers with a dual-layer tube, with the inner layer of the tube consisting of an aluminum alloy for high tensile load which is coated on the outside with a layer of pure aluminum to protect against corrosion. The tubes can be made by combining any number of non-ferrous metals.

The diameter of a metal tube can be further reduced by a drawing step, after the tube exits the forming nozzle. This aspect provides a sufficiently large separation between the fibers in the center of the forming nozzle and the hot metal in the region of the exit opening, in particular for metal tubes with a small diameter.

An outer metal tube can also be drawn over an inner metal tube. This produces a connection with a high tensile strength. Heat sensitive isolation can also be incorporated between the two metal tubes. A sufficiently high feed velocity and/or excess length of the optical fibers or the inner metal tube passing through the feed opening prevents undesirable tensile stress when the outer metal tube is stretched.

Optical fibers arranged inside a tube are typically protected by embedding the fibers in a filler material. Advantageously, thixotropic gels are used.

Optical fibers and thixotropic gels are temperature-sensitive and should not contact the hot metal in the region of the exit opening. Accordingly, the feed opening of the forming nozzle is advantageously formed by one or several hollow needles, through which needles the fibers and/or the filler material are introduced in the metal tube. Simultaneously, the hollow needle guides the fibers and the filler material, respectively, and prevents contact between the fibers and the filler material, respectively, and the wall of the metal tube in the region of the forming nozzle.

Advantageously, the hollow needle projects from the end face of the forming nozzle and allows contact between the fibers and the filler material, respectively, and the metal tube only after the metal tube has sufficiently cooled down. If the metal tube passes through a cooling device after exiting the forming nozzle, then one end of the hollow needle preferably extends into the cooled region. If the diameter of the metal tube is reduced by a drawing step, then the hollow needle advantageously extends into the region where the diameter is reduced. In both cases, one end of the hollow needle can project from the retaining block for forming the metal tube.

The invention will be described hereinafter with reference to an embodiment schematically illustrated in the drawing.

DETAILED DESCRIPTION OF THE INVENTION

Figure 1:
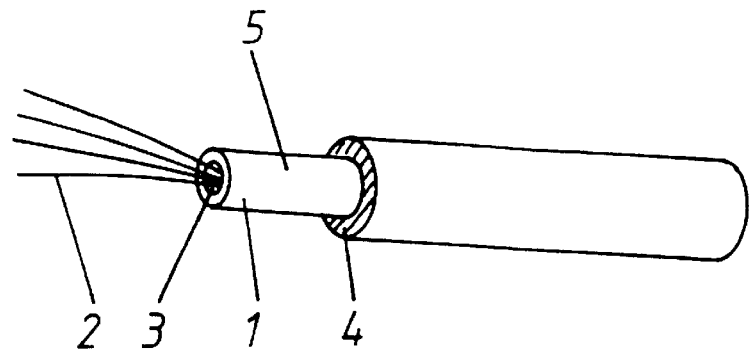
FIG. 1 is a perspective view of a metal tube produced with the method of the invention.

Referring first to FIG. 1, an inner metal tube 1 made by the method of the invention is made of a non-ferrous metal, preferably aluminum, and encloses one or several optical fibers 2 extending in the longitudinal direction. The optical fibers 2 are disposed in a filler material 3, preferably a thixotropic gel, which fills the hollow space of the metal tube 1. On the outside, the metal tube 1 is surrounded by another or outer metal tube 4 to protect against corrosion. To prevent contact corrosion, the other metal tube 4 advantageously has an electro-chemical potential which matches the potential of those components which are in contact with the other metal tube 4 after installation. The outer surface 5 of the metal tube 1 can also be coated with an insulator. The metal tubes 1,4 are then insulated from each other and can therefore be used to supply electrical power, in particular to electro-optic elements (not shown), such as amplifiers cooperating with the fibers 2.

Figure 2:
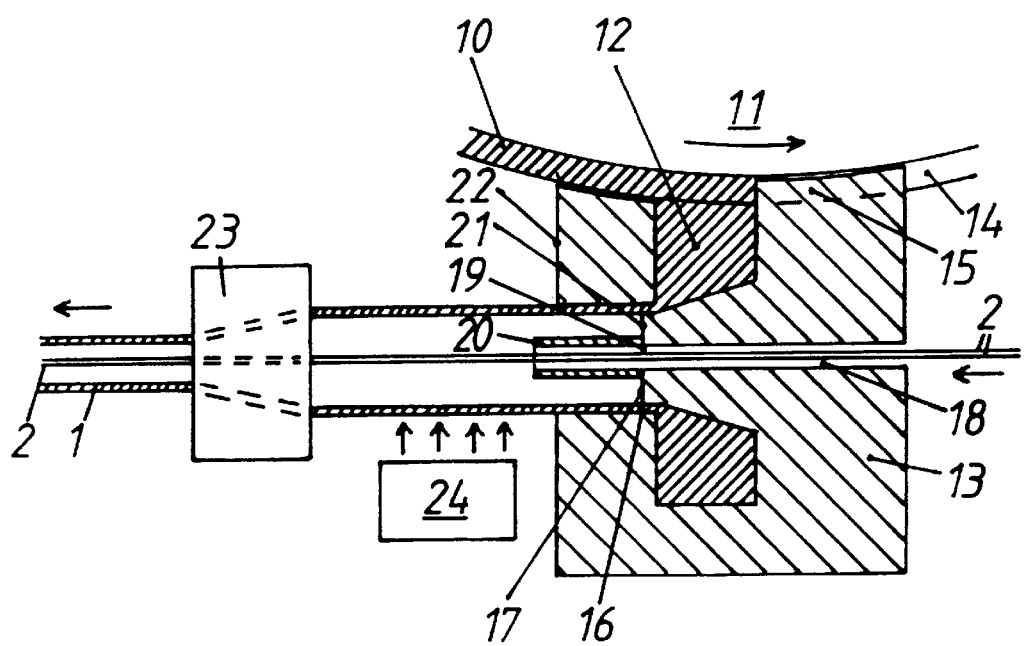
FIG. 2 is a cross-sectional view of a device for carrying out the method.

FIG. 2 shows a device for manufacturing the metal tube 1 with optical fibers 2 therein. The metal 10 for producing the tube 1 is conveyed from a rotating frictional wheel 11 into the retaining space 12 of a retaining block 13. The frictional wheel 11 has one or several circumferential grooves 14 arranged along the circumference which are sealed by a projection 15 of the retaining block 13. The increase in temperature at the surface of the frictional wheel 11 and the pressure produced by the continuously conveyed material cause the metal 10 to become plastic. The metal 10 can be then be pressed through the exit opening 16 of a forming nozzle 17 to form the metal tube 1.

The fibers 2 pass through the retaining block 13 in a channel 18 which terminates in a feed opening 19 in the center of the forming nozzle 17. To improve guiding and to prevent damage during metal extrusion, the fibers extend in a hollow needle 20 which projects over the end face 21 of the forming nozzle 17. Preferably, the hollow needle 20 projects over the outer face 22 of the retaining block 13. The fibers 2 are then prevented from coming in contact with the hot metal 10 in the region of the forming nozzle 17. The filler material 3 surrounding the fibers 2 is also channeled through the channel 18 and the hollow needle 20 into the inside of the metal tube 1.

Located after the retaining block 13 is a drawing device 23 to reduce the diameter of the metal tube 1 to a predetermined value. To prevent mechanical stress, the fibers 2 must pass through the hollow needle 20 with at least the same speed which the metal tube 1 has after passing the drawing device 23. To produce an excess length inside the metal tube 1, the fibers 2 can be moved through the channel 18 with a slightly higher feed velocity. Advantageously, a cooling device 24 is provided for cooling the metal tube 1 when the metal tube 1 exits from the retaining block.

A similar device can be used to produce the other metal tube 4, as illustrated in FIG. 1. Instead of only the fibers 2, the metal tube 1 together with fibers 2 enclosed in the metal tube 1 are passed through the channel 18. The hollow needle 20 can be omitted in this case since the fibers 2 are already protected by the metal tube 1. To provide a mechanically strong connection, the other metal tube 4 is drawn on the metal tube 1 in the drawing device 23.

The embodiment described above admirably achieves the object of the invention. However, it will be appreciated that departures can be made by those skilled in the art without departing from the spirit and scope of the invention which is limited only by the following claims.

What is claimed is:

1. Method for producing a metal tube with at least one optical fiber extending therethrough, comprising the steps of:
   (a) placing metal on a surface of a frictional wheel having a circumference;
   (b) conveying the metal on the surface of the frictional wheel to a retaining space by applying pressure and temperature;
   (c) extruding the metal from the retaining space through an annular exit opening of a forming nozzle in a direction which is approximately tangential to the circumference of the frictional wheel to form a metal tube as the metal solidifies;
   (d) passing at least one optical fiber through a feed opening disposed in the forming nozzle into the metal tube, the at least one fiber being spaced apart from the exit opening, the feed opening of the forming nozzle is a hollow needle through which the at least one optical fiber is introduced into the metal tube; and
   (e) embedding the at least one optical fiber in a filler material disposed inside the metal tube, the filler material being introduced into the metal tube through the hollow needle.

2. Method according to claim 1, further comprising the step of drawing the metal tube to reduce its diameter after the metal tube exits the forming nozzle.

3. Method according to claim 1, wherein the hollow needle projects from an end face of the forming nozzle.

4. Method according to claim 1, further including the step of passing the metal tube through a cooling device after exiting from the forming nozzle.

5. Method according to claim 4, further including the step of drawing the metal tube to reduce its diameter after the metal tube exits from the cooling device.

6. Method according to claim 1, further comprising the steps of:
   (a) placing metal on a surface of another frictional wheel having a circumference;
   (b) conveying the metal on the surface of the other frictional wheel to another retaining space by applying pressure and temperature;
   (c) extruding the metal from the other retaining space through another annular exit opening of another forming nozzle in a direction approximately tangential to the circumference of the other frictional wheel to form an outer metal tube as the metal extruded through the other annular exit solidifies; and
   (d) passing the metal tube with the at least one optical fiber disposed therein through another feed opening disposed in the other forming nozzle into the outer metal tube.

7. Method according to claim 6, further including the step of coating an outer surface of the metal tube with the at least one optical fiber disposed therein with an insulator before passing through the other feed opening.

8. Method according to claim 6, further including the step of drawing the outer metal tube to reduce its diameter onto the metal tube with the at least one optical fiber therein.

9. Method according to claim 6, further including the step of passing the out er metal tube through another cooling device after exiting from the other forming nozzle.

10. Method according to claim 9, further including the step of drawing the outer metal tube to reduce its diameter onto the metal tube with the at least one optical fiber disposed therein.

* * * * *